United States Patent

[11] 3,619,555

| [72] | Inventor | Arthur T. Bassett, Jr. Dayton, Ohio |
|---|---|---|
| [21] | Appl. No. | 5,057 |
| [22] | Filed | Jan. 22, 1970 |
| [45] | Patented | Nov. 9, 1971 |
| [73] | Assignee | General Motors Corporation Detroit, Mich. |

[54] INFRARED CAR HEATER
1 Claim, 4 Drawing Figs.

[52] U.S. Cl. ............................................. 219/202, 219/343, 219/347, 219/355, 250/86, 313/112
[51] Int. Cl. ............................................. B60l 1/02, H05b 3/02
[50] Field of Search ........................................ 219/339, 342, 343, 347–358, 202, 203, 279; 250/86; 313/112

[56] References Cited
UNITED STATES PATENTS

| 1,754,669 | 4/1930 | Cohen | 219/203 X |
| 2,599,029 | 6/1952 | Turner et al. | 219/347 |
| 2,601,011 | 6/1952 | Wilcox | 219/461 |
| 2,681,409 | 6/1954 | Dobbins | 219/347 |
| 2,910,605 | 10/1959 | Hodge | 219/347 UX |
| 3,059,086 | 10/1962 | Pedersen | 219/343 |
| 3,188,513 | 6/1965 | Hansler | 313/112 |
| 3,204,085 | 8/1965 | Busby | 219/352 X |

FOREIGN PATENTS

| 927,944 | 5/1947 | France | 219/353 |
| 1,229,453 | 3/1960 | France | 219/354 |
| 970,043 | 9/1964 | Great Britain | 219/347 |

Primary Examiner—A. Bartis
Attorneys—William S. Pettigrew and John C. Evans

ABSTRACT: An infrared heater for warming the passenger compartment of an automobile is adapted to be adjustably supported from the underside of the dashboard. The heater includes an elongated resistance heating element which is encircled by an inner filter tube which is transparent to infrared radiation from the heating element, but which blocks visible light from passing into the passenger compartment. A semicircular reflector within the filter tube directs radiation from the element into the compartment. An outer, larger diameter, protective tube encircles the filter tube in spaced relation thereto. The protective tube is also transparent to infrared radiation from the element but may or may not filter visible light as does the inner tube. The space between the tubes is vented to thermally insulate the outer tube and to prevent undesirable temperature increase during heater operation. A control circuit is provided which permits the heater to be energized only when the vehicle engine coolant is below a predetermined temperature and the ignitions switch is on.

PATENTED NOV 9 1971
3,619,555
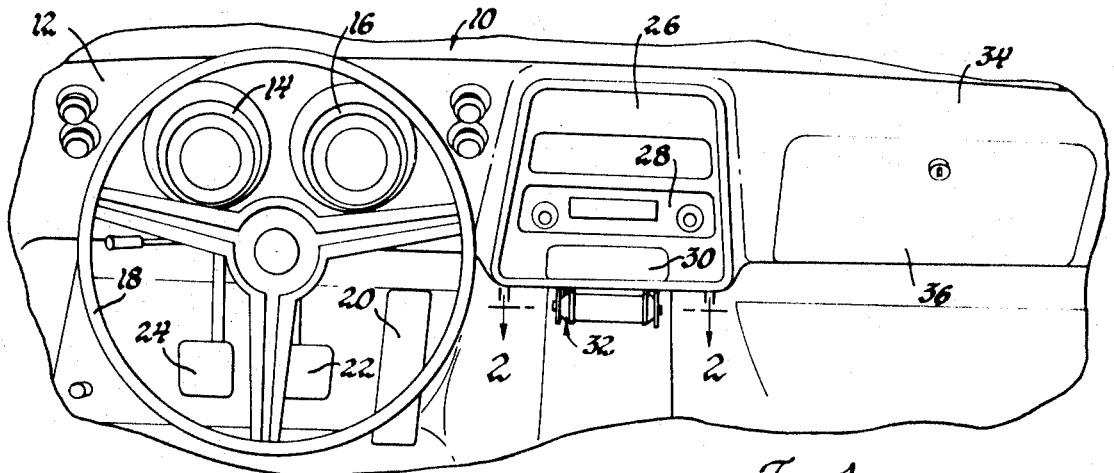
Fig.1
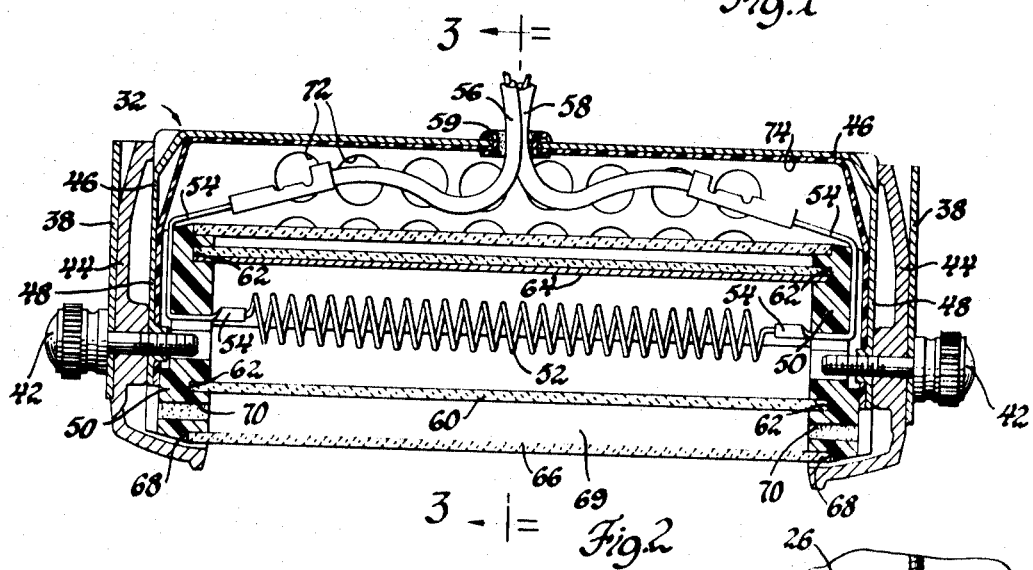
Fig.2
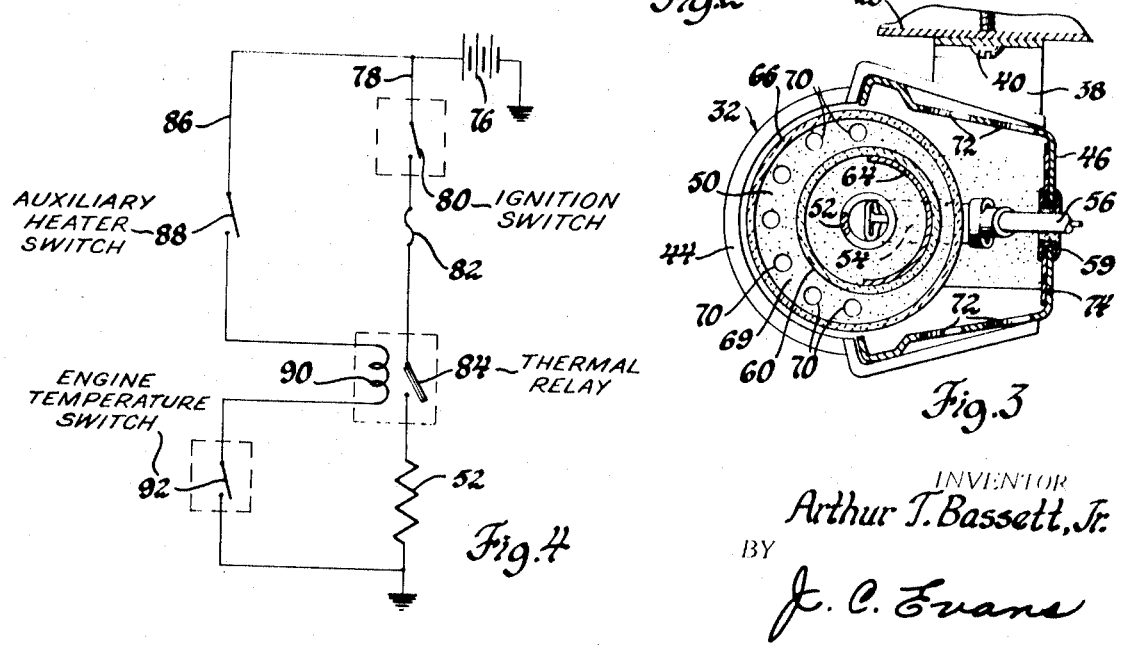
Fig.3
Fig.4
INVENTOR
Arthur T. Bassett, Jr.
BY
J. C. Evans
ATTORNEY

INFRARED CAR HEATER

The interior of an automobile is normally heated during cool weather by a heat exchanger containing warm coolant from the automobile's internal combustion engine. Although this manner of heating is successful, it has one noticeable drawback. During the period of time when the engine is first started until the engine reaches its operating temperature, the coolant temperature is insufficient to warm the automobile interior. Thus, it is desirable to provide auxiliary heating of the automobile passenger compartment during this period.

The present infrared heater utilizes a resistance wire element to produce infrared radiation. A semicircular reflector directs the radiation from the wire element into the automobile interior to warm passengers. The heater includes mounting means adapted to support the heater beneath the dashboard or at other appropriate locations in the passenger compartment. An inner cylindrical tube and an outer cylindrical tube surround the wire element to block the passage of visible light from the wire element into the automobile interior. The space between the inner tube and the outer tube is vented to insulate the outer tube and to prevent an undesirable increase in its temperature.

Therefore, an object of the inventor in the present invention is to provide an infrared heater for warming an automobile interior having at least one filter encircling a resistance wire element to protect the element and to block the passage of visible light into the automobile interior.

A still further object of the inventor in the present invention is to provide an infrared heater for warming an automobile interior including a resistance wire element as a source of infrared radiation, a semicircular reflector adjacent the element, an inner cylindrical filter tube around the wire element and the reflector, an outer cylindrical tube around the inner filter tube with the space between the filters vented to atmosphere to prevent undesirable heating of the outer tube.

Further objects and advantages of the present invention will be apparent from the following detailed description, reference being had to the accompanying drawings wherein a preferred embodiment is illustrated.

IN THE DRAWINGS

FIG. 1 is a fragmentary view of an automobile dashboard looking from the passenger compartment and showing the subject infrared heater;

FIG. 2 is a sectional view of the infrared heater taken along section line 2—2 in FIGURE 1 and looking in the direction of the arrows;

FIG. 3 is a sectional view of the infrared heater taken along section line 3—3 in FIGURE 2 and looking in the direction of the arrows;

FIG. 4 is a circuit diagram suitable for use with the subject heater.

In FIG. 1, a dashboard 10 of an automobile is shown which defines the front wall of the automobile interior. A portion 12 of dashboard 10 contains instruments 14 and 16 for monitoring the operation of the automobile. A steering wheel 18, accelerator 20, brake pedal 22 and clutch pedal 24 control the operation of the automobile. A central portion 26 of dashboard 10 includes a radio 28 and a pullout type ash tray 30. The subject infrared heater 32 is supported on the underside of portion 26 of dashboard 10. A portion 34 of dashboard 10 encloses a glovebox whose door 36 is illustrated.

The subject infrared heater 32 is more particularly shown in FIGS. 2 and 3. The heater 32 is suspended from the underside of portion 26 of dashboard 10 by legs 38. The legs 38 are secured at their upper ends to the dashboard by screws 40 and at their lower ends to end caps 44 and a frame 46 by threaded fasteners 42. Frame 46 is channel shaped and has ends 48 into which fasteners 42 are threadably retained.

Spaced end members 50 support a helically wound wire resistance element 52 therebetween which is a source of infrared radiation. The ends of wire element 52 are retained by U-shaped clips 54 which extend through and around the end members 50 and are connected to conductors 56 and 58. Conductors 56 and 58 extend through a grommet 59 and are electrically connected through a switch on the dashboard (not shown) to the battery of the automobile. When electrical current is passed through conductors 56, 58, the clips 54 and wire element 52, infrared radiation is emitted from the element 52 to warm the automobile interior.

The resistance wire element 52 may be of any material which emits infrared radiation in response to an electrical current. Nichrome is a nickel-chromium alloy which is suitable for infrared elements at temperatures below 1,800° F. Under this maximum temperature, nickel-chromium alloys have good hot strength properties and are resistant to oxidation. Iron-chromium-aluminum alloys may also be utilized for infrared wire filaments.

An elongated filter tube 60 encircles the element 52 and extends between the end members 50. Opposite ends of filter tube 60 are supported within annular channels 62 in the end members 50. A semicircular reflector 64 is adjacent the inner surface of filter tube 60 and its ends are also supported within channels 62. A larger outer protector tube 66 encircles inner filter tube 60 and the element 52 and is supported within annular grooves 68 in end members 50. Tube 66 is adapted to protect the inner filter tube 60 from external forces and may or may not filter visible light as does tube 60.

Tubes 60 and 66 are transparent to infrared radiation. Tube 60 substantially blocks visible light from passing into the interior of the automobile and tube 66 may also be of a material which blocks visible light. A suitable material for the tubes 60 and 66 is quartz which has desirable infrared transmission properties. Another suitable material for the filter tubes is Cer-vit. Cer-vit is a glass ceramic made by Owens-Illinois Co. and is considerably cheaper than quartz and can be molded into a wide variety of colors and has good control of visible light transmission.

Reflector 64 includes a semicircular metal substrate having a material such as gold deposited upon its convex surface to form a highly reflective member for directing infrared radiation into the interior of the automobile. Normally gold, silver and aluminum are all regarded as good reflective materials. However, silver and aluminum tarnish at elevated temperatures and, therefore, are not as desirable as gold. When gold is deposited upon an aluminum substrate in a very thin coating (approximately 0.000005 inch thick), a low cost, high efficiency reflector is produced.

As previously stated, the primary function of filter tube 60 is to block the transmission of visible light into the interior of the automobile while transmitting infrared radiation. Protector tube 66 prevents human contact with the inner filter tube 60 which becomes quite warm during operation of the heater. The air-filled space 69 between tubes 60 and 66 insulates the outer protector tube 66 and prevents its temperature from becoming undesirably high. Vent holes 70 through the end members 50 communicate the space 69 with the automobile interior. This disperses heat and limits the temperature of outer protector tube 66.

A plurality of ports 72 in the channel-shaped frame 46 disperse heat energy from the interior of heater 32 to the automobile interior. An insulating strip 74 lines the inner surface of frame 46 to protect the ends of clips 54. The frame 46 and therefore the reflector 64 is pivoted with respect to end caps 44 and legs 38 by loosening fasteners 42 and pivoting the frame into a desirable angular position. In this manner, infrared energy can be directed to desirable portions of the automobile interior.

Initial testing of an infrared heater revealed that a desirable range of power inputs is approximately 200 to 250 watts. This produces sufficient warming of automobile passengers until the main heater is operable which occurs when the engine coolant warms sufficiently.

FIGURE 4 shows a circuit diagram which is suitable for use with the heater 32. When the heater is operating, a circuit is completed from the automobile battery 76 through a conductor 78, ignition switch 80, fuse 82, a bimetal heater relay 84 and the wire element 52 to ground. The bimetal heater relay is closed by a circuit extruding from battery 76 through a conductor 86, a dashboard on-off switch 88, a heater relay coil 90 and a heater water thermal switch 92 to ground. Switch 92 is closed when engine coolant is below a predetermined minimum value.

While the embodiment of the present invention as herein described constitutes a preferred form, it is to be understood that other forms may be adapted.

What is claimed is as follows:

1. An auxiliary infrared heating system adapted to be placed in the front of an automobile passenger compartment for directing infrared radiation rearward upon occupants during the period in which the engine coolant temperature is insufficient to warm the passenger compartment comprising: an elongated infrared heating element with first and second terminals operatively connected to an automobile battery by a circuit including an ignition switch; thermally responsive switch means between said heating element and said battery for energizing said heating element whenever engine coolant is below a predetermined temperature and said ignition switch is on; spaced end members supporting opposite ends of said heating element; a semicircular reflector extending between said end members and partially around said heating element for reflecting infrared radiation therefrom rearward into said passenger compartment; a cylindrical filter tube extending between said end members and around said reflector and heating element to prevent the transmission of visible light into said passenger compartment; a second larger diameter cylindrical tube supported around said first cylindrical tube in spaced relation by said end members defining an annular space between said cylindrical tubes; said end members having openings therethrough between atmosphere and said annular space wherein air flow through said openings and said annular space decreases the temperature of said second tube.

* * * * *